United States Patent
Tsuji et al.

(10) Patent No.: US 6,552,752 B1
(45) Date of Patent: Apr. 22, 2003

(54) CLOCK GENERATING BASED ON A REFERENCE SIGNAL INCLUDED IN THE DIGITAL INPUT DATA OF A DIGITAL BROADCASTING RECEIVER

(75) Inventors: Toshiaki Tsuji, Hyogo (JP); Toshiroh Nishio, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/485,387

(22) PCT Filed: Jun. 9, 1999

(86) PCT No.: PCT/JP99/03068

§ 371 (c)(1),
(2), (4) Date: May 17, 2000

(87) PCT Pub. No.: WO99/65150

PCT Pub. Date: Dec. 16, 1999

(30) Foreign Application Priority Data

Jun. 9, 1998 (JP) .............................. 10-160252

(51) Int. Cl.[7] .............................. H04N 5/63; H04N 5/68; H04M 1/00; G09G 5/00
(52) U.S. Cl. .................. 348/730; 348/380; 348/372; 348/805; 345/211; 345/212; 345/213; 455/574
(58) Field of Search ................. 348/730, 805, 348/380, 372; 345/211, 212, 213; 455/574, 572; 370/311; H04N 5/63, 5/68

(56) References Cited

U.S. PATENT DOCUMENTS

| 4,582,434 | A | | 4/1986 | Plangger et al. |
| 4,993,003 | A | | 2/1991 | Fechner et al. |
| 5,477,279 | A | * | 12/1995 | Chang ........................ 348/730 |
| 5,555,032 | A | * | 9/1996 | Kung ......................... 348/730 |
| 5,566,363 | A | * | 10/1996 | Senda ........................ 455/126 |
| 6,211,867 | B1 | * | 4/2001 | Kim .......................... 345/211 |
| 6,259,681 | B1 | * | 7/2001 | Kolev et al. ................ 370/311 |
| 6,285,399 | B1 | * | 9/2001 | Tao ........................... 348/311 |

FOREIGN PATENT DOCUMENTS

| DE | 44 23 366 | 10/1995 |
| EP | 0 258 838 | 3/1988 |
| EP | 0 562 410 | 9/1993 |
| JP | 57130133 | 8/1982 |
| JP | 06180617 | 6/1994 |
| JP | 08161076 | 6/1996 |
| KR | 0020526 | 12/1991 |
| KR | 0012844 | 6/1994 |

OTHER PUBLICATIONS

ISO/IEC: "Information Technology—Generic Coding of Moving Pictures and Associated Audio Information—Part 1: Systems", 1994, ISO/IEC XP002214463, pp. 98–100.

* cited by examiner

*Primary Examiner*—John Miller
*Assistant Examiner*—Paulos Natnael
(74) *Attorney, Agent, or Firm*—Wenderoth, Lind & Ponack, L.L.P.

(57) ABSTRACT

When an STB is powered off when it is not used (when it is changed to the sleep mode) for the purpose of power-saving, a difference in a subtracter immediately therebefore is held by a control circuit and an oscillation circuit is controlled on the basis of the difference, thereby performing reserved processing at a correct time even when the STB is in the sleep mode.

4 Claims, 3 Drawing Sheets

CLOCK GENERATING BASED ON A REFERENCE SIGNAL INCLUDED IN THE DIGITAL INPUT DATA OF A DIGITAL BROADCASTING RECEIVER

TECHNICAL FIELD

The present invention relates to a broadcasting receiver and, more particularly, to a broadcasting receiver having a power-saving (sleep) mode for reducing power consumption on standby, where precision of an internal timer is improved.

BACKGROUND ART

In recent years, plural broadcasting satellites have been launched, and thereby digital broadcastings using the satellite waves have been started by plural broadcast distributors. In order to receive services of the broadcastings, a set top box (hereinafter, also referred to as STB) should be installed as a receiver, which is to be a decoder for decoding compressed signals of the received broadcasting and converting the same into signals which can be displayed on a display unit such as a CRT.

FIG. 5 is a block diagram mainly illustrating a clock generation unit in a STB as the above-described receiver, which is shown in the standards of MPEG, SO/IEC 13818-1 generic coding of moving pictures and associated audio: systems, Annex D.0.3 System Time Clock recovery in the. decoder. In the figure, reference numeral 10 denotes a capture PCR for capturing a PCR (Program Clock Reference) indicating a broadcasting time for each program, which is included in a transport stream. Numeral 11 denotes a subtracter for generating a difference between an output of an STC counter, which will be described later, and an output of the capture PCR 10. Numeral 13 denotes a low-pass filter for cutting high frequency components that are above a predetermined value so as to prevent an oscillation circuit 15, which will be described later, from significantly fluctuating (diverging) when the difference is abruptly changed. Numeral 14 denotes a D/A converter for converting a signal which passed through the filter 13 into an analog signal. Numeral 15 denotes an oscillation circuit, such as a voltage controlled oscillator (VCO), oscillation frequencies of which are controlled by an analog signal (voltage). Numeral 16 denotes an STC (System Time Clock) counter operating with a frequency signal (clock) output from the oscillation circuit 15 and functioning as an internal timer in the system. In addition, around this clock generation unit, circuits such as a tuner for selecting a channel or a decoder for decoding data are placed.

Using the above-described structure, a predetermined frequency signal is generated on the basis of a PCR indicating a broadcasting time for each program, which is included in the transport stream, and the internal timer in the system is operated. That is, the PCR detected by the capture PCR 10 is converted into an analog signal by the D/A converter 14, after its high frequency components above the predetermined value are cut off by the filter 13. Then, the oscillation circuit 15 receives the converted analog signal (voltage) as an input and outputs a frequency signal, and the STC counter 16 in the latter stage operates with the frequency signal. Then, a difference between the output of the STC counter 16 and the output of the capture PCR 10 is generated by the subtracter 11. By adjusting a loop from the subtracter 11 to the STC counter 16 so as to have the difference of "0", a clock in synchronization with an input signal can be reproduced.

Anyhow, in recent years, there are some household electrical appliances in which the power consumption during standby when they are not used is not much smaller than that during operation.

Also in the STB, as in a television apparatus, it is considered to be preferable that unnecessary elements, such as a tuner or a decoder, should be powered off when they are not used, i.e., they are not in operation. Therefore, some STBs are constructed so as to be in the sleep mode (referred to also as an operation standby state) till a reserved processing start time. However, since reservation processings are performed with respect to playback/recording or the like in the STB, when the power is turned off for a long time, an error occurs in the internal timer and the reserved processing cannot be executed at a correct time.

The conventional broadcasting receiver is constructed as described above, and it does not have a structure for realizing lower power consumption on standby or, even when it has a structure which can put the STB into the sleep mode for the lower power consumption, it cannot perform the reserved processing at a correct time due to the error in the internal timer.

The present invention is made to solve the above-described problems and it is an object of the present invention to provide a broadcasting receiver which can perform the reserved processing at a correct time even when the STB is put into the sleep mode.

DISCLOSURE OF THE INVENTION

A broadcasting receiver according to an embodiment of the present invention, which generates a clock of a predetermined frequency on the basis of a reference signal included in digital data including time-axis information and has an internal timer operating with the clock, comprises: reference signal detection means for detecting the reference signal; clock generation means for generating a clock of a frequency on the basis of the reference signal; counter means for counting the clock; difference generation means for calculating a time difference between output of the counter means and the reference signal; and control means for holding the output of the clock generation means when the receiver is changed to an operation standby state.

According to the present invention, when the receiver is in the operation standby state, the reference signal detection means detects the reference signal, the holding operation of the control means is released, and the receiver is put into an operation state for a prescribed time.

According to the present invention, a transport stream is utilized as the digital data including the time-axis information and a PCR (Program Clock Reference) indicating a broadcasting time for each program is utilized as the reference signal.

According to the present invention, a transport stream is utilized as the digital data including the time-axis information and a TDT (Time and Data Table) indicating a broadcasting time for each program is utilized as the reference signal.

As described above, according to the broadcasting receiver of the present invention, when the STB is changed into the sleep mode, a difference is immediately held by the control circuit and the oscillation circuit is controlled on the basis of the difference. Therefore, even in the sleep mode when the PCR cannot be detected, the great divergence of the oscillation frequencies can be avoided, whereby processings such as reserved processings can be performed on time.

In addition, the receiver is started at a uniform time interval during the sleep mode, receives the transport stream to detect the reference signal, and thereby occasionally corrects the time. Therefore, the precision of the internal timer can be further improved.

BEST MODE FOR CARRYING OUT THE INVENTION

Hereinafter, embodiments of a broadcasting receiver of the present invention will be described with reference to the drawings.

Embodiment 1

Figure 1:
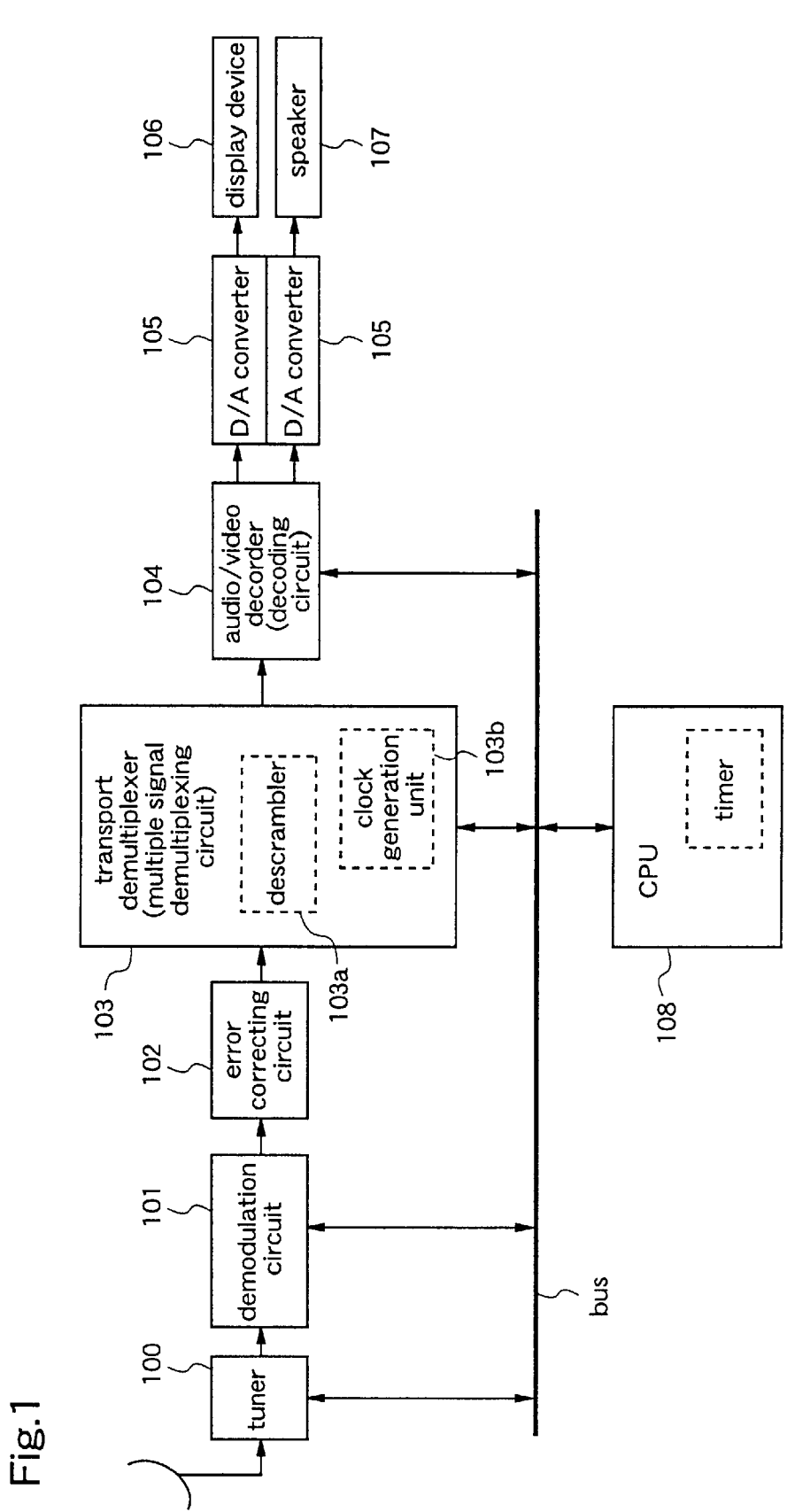
FIG. 1 is a block diagram illustrating a whole structure of a broadcasting receiver according to a first embodiment of the present invention.

FIG. 1 is a block diagram illustrating a whole structure of an STB as a broadcasting receiver according to a first embodiment of the present invention. In the figure, reference numeral 100 denotes a tuner for receiving a broadcasting signal and selecting a desired channel. Numeral 101 denotes a demodulation circuit for demodulating a digital signal sequence of signals in the channel selected by the tuner. Numeral 102 denotes an error correcting circuit for performing error correction for the demodulated digital signal sequence. Numeral 103 denotes a transport demultiplexer (multiplexed signal demultiplexing circuit) for selecting one transport stream from plural transport streams included in the digital signal sequence and further extracting a digital signal sequence of only a desired program. Numeral 104 denotes an audio/video decoder (decoding circuit) for decoding the digital signal sequence extracted from the transport demultiplexer 103 into decompressed digital signals. Numeral 105 denotes a D/A converter for converting audio/video in digital form into audio/video in analog form. Numeral 106 denotes a display device, such as a CRT. Numeral 107 denotes a speaker. Numeral 108 denotes a CPU for controlling operations of the respective elements via a bus. In addition, the transport demultiplexer 103 includes a descrambler circuit 103a for descrambling a scrambled signal of fee-charged broadcasting or the like, and a clock generation unit 103b.

Figure 2:
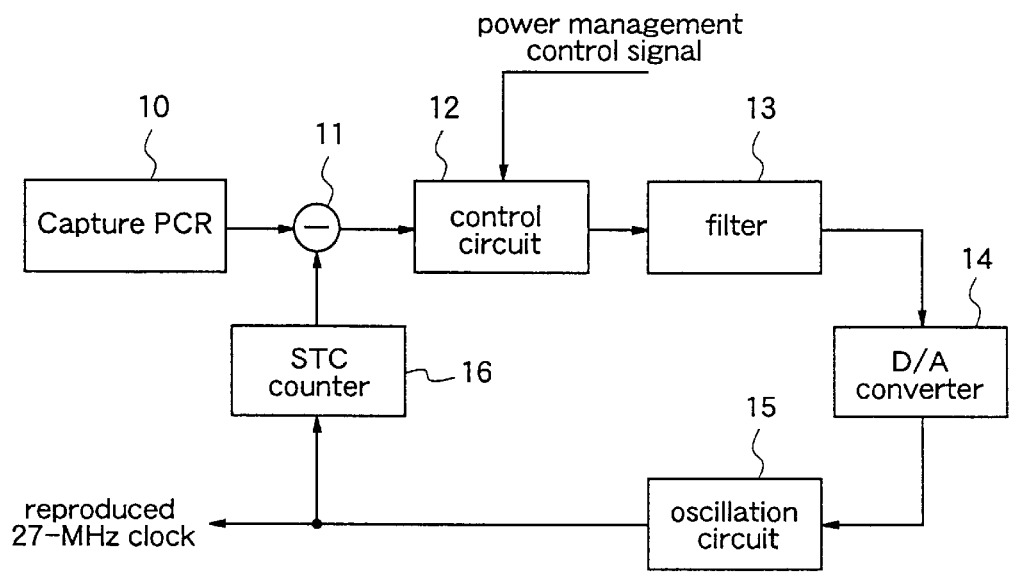
FIG. 2 is a block diagram illustrating mainly a clock generation unit in the broadcasting receiver according to the first embodiment.

FIG. 2 is a diagram illustrating a structure of a clock generation unit in the broadcasting receiver of the first embodiment. In the figure, reference numeral 10 denotes a capture PCR for capturing a PCR (Program Clock Reference) indicating a broadcasting time for each program, which is included in the transport stream. Numeral 11 denotes a subtracter for generating a difference between an output of an STC counter, which will be described later, and an output of the capture PCR 10. Numeral 12 denotes a control circuit operating upon receipt of a power management control signal which is used when the apparatus is changed into the sleep mode and holding the difference of the subtracter 11. This control circuit is realized, for example, by a well-known latch circuit or a flip-flop (FF) with Load/Hold. Further, numeral 13 denotes a low-pass filter for cutting high frequency components that are above a predetermined value so as to prevent an oscillation circuit 15, which will be described later, from significantly fluctuating (diverging) when the difference is abruptly changed. Numeral 14 denotes a D/A converter for converting a signal which passed the filter 13 into an analog signal. Numeral 15 denotes an oscillation circuit, such as a voltage controlled oscillator (VCO), oscillation frequencies of which are controlled by an analog signal (voltage). Numeral 16 denotes an STC (System Time Clock) counter operating with a frequency signal (clock) output from the oscillation circuit 15 and functioning as an internal timer in the system.

Figure 3:
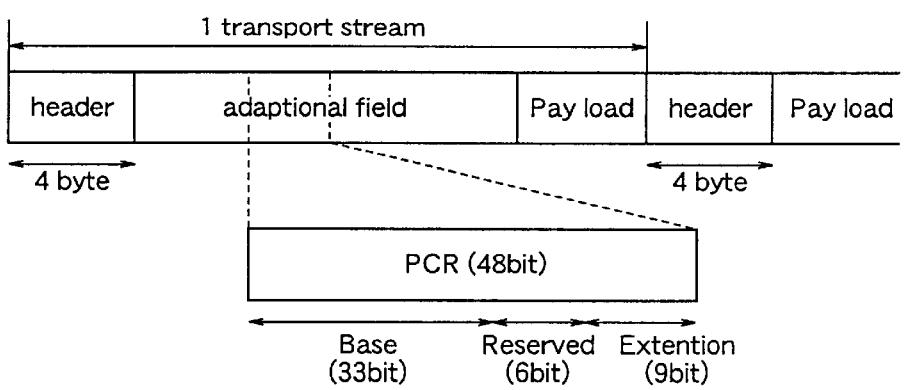
FIG. 3 is a diagram illustrating an example of a transport stream input to the clock generation unit in the broadcasting receiver of the first embodiment.

Next, an operation of the STB when the power is turned on will be described. The capture PCR 10 captures a PCR included in a transport stream and outputs the same. FIG. 3 shows an example of the transport stream, which comprises a header at the head, followed by an adaptation field, video data (Pay Load), . . . A PCR is data existing within the adaptation field having control information described thereon and, practically, data transmitted at intervals of 100 msec. or shorter. At this time, since the power management control signal (PMC) is not input, the control circuit 12 outputs the data which passed through the subtracter 11 as it is to the filter 13 in the next stage. High frequency components of signals more than the predetermined value are removed from the data by the filter 13 and signals are converted into analog signals by the D/A converter 14 in the next stage. By Then, the oscillation circuit 15 generates a clock of a frequency corresponding to the input, according to the converted analog signal: The STC counter 16 operates with this clock, for example a 27-MHz clock, and performs a timer operation on the clock as the reference of the system. Then, in the subtracter 11, a difference between the output of the STC counter 16 and an input PCR signal is generated. When the output of the oscillation circuit 15 has a frequency coinciding with the transmitted PCR, the difference is zero and a stable clock is reproduced.

In the above-described state, when a reservation processing or the like is performed and the system is not required to be started till the reserved processing start, the system is put into the sleep mode and the operations of most parts of the system are stopped by the power management control signal. Then, the capture PCR 10 cannot detect the PCR. At the same time, the control circuit 12 starts its operation and holds the difference of the subtracter 11 just before the powering off.

Thereafter, the output of the oscillation circuit 15 is controlled on the basis of the difference held by the control circuit 12.

In this way, also after the system is changed into the sleep mode, a relatively stable clock can be reproduced. However, due to a transmission jitter (fluctuation) of the PCR itself, a divergence in time has already arisen sometimes when the difference is held at the changing to the sleep mode.

In this embodiment, the system is automatically started once per prescribed time after the sleep mode, thereby receiving a transport stream to correct the time. Assume that the transmission jitter of PCR is ±100 ppm, a maximum of 100-ppm divergence is generated. In this case, when a 27-MHz clock is to be reproduced, the clock is changed to 27.0027 MHz. When the system is put into the sleep mode for 30 minutes with this error, a divergence of 0.18 seconds is generated. Accordingly, the system is started every three hours to receive the transport stream, whereby the error is reduced to within 1 second. Therefore, there is no problem with the precision of the internal timer of the system for practical use.

While the power is consumed at this time, for example, the STB consumes about 10W/H of power in the normal operation and about 0.5W/H in the sleep mode. Therefore, even when the system is operated for 5 minutes, in the sleep mode, the system consumes only about 0.7–0.8W/H of power and the increase in the power consumption due to that operation is almost insignificant.

As described above, according to this embodiment, when the STB is changed into the sleep mode, the control circuit 12 holds the difference of the subtracter 11 immediately therebefore and the oscillation circuit 15 is controlled on the basis of the difference. Therefore, also in the sleep mode when the PCR cannot be detected, a great divergence of the oscillation frequencies can be avoided, resulting in an improved precision in the internal timer. Consequently, processings such as the reserved processing can be performed on time.

In addition, the system is started at a uniform time interval during the sleep mode to receive the transport stream, detect the PCR, and occasionally correct the time, whereby the precision in the internal timer is further improved.

Embodiment 2

Hereinafter, a broadcasting receiver according to a second embodiment of the present invention will be described with reference to the drawings. While in the first embodiment the clock is reproduced by detecting the PCR, the second embodiment is different from the first embodiment in that the clock is reproduced by detecting a TDT (Time and Data Table) included in the transport stream.

Figure 4:
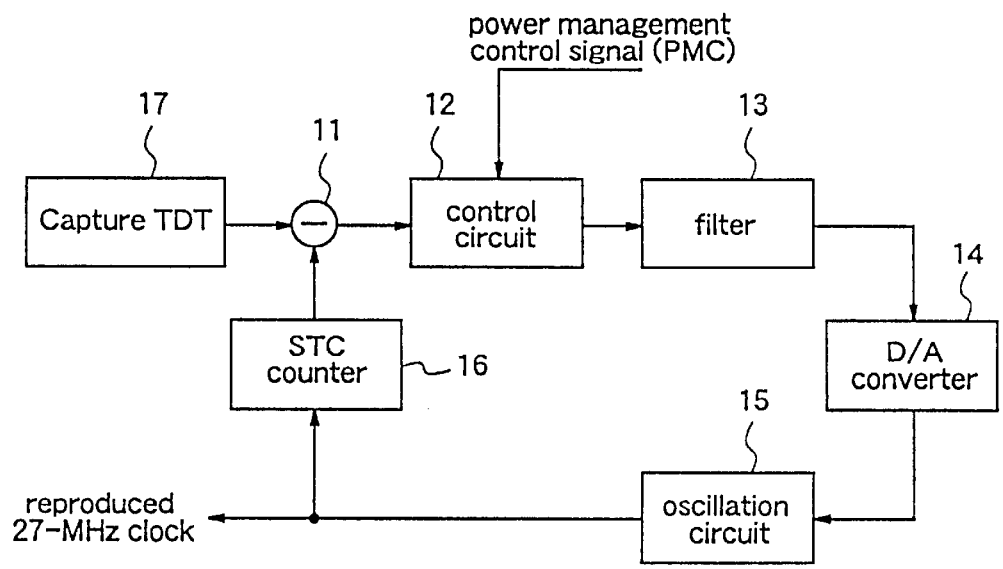
FIG. 4 is a block diagram illustrating mainly a clock generation unit in a broadcasting receiver according to a second embodiment of the present invention.
Figure 5:
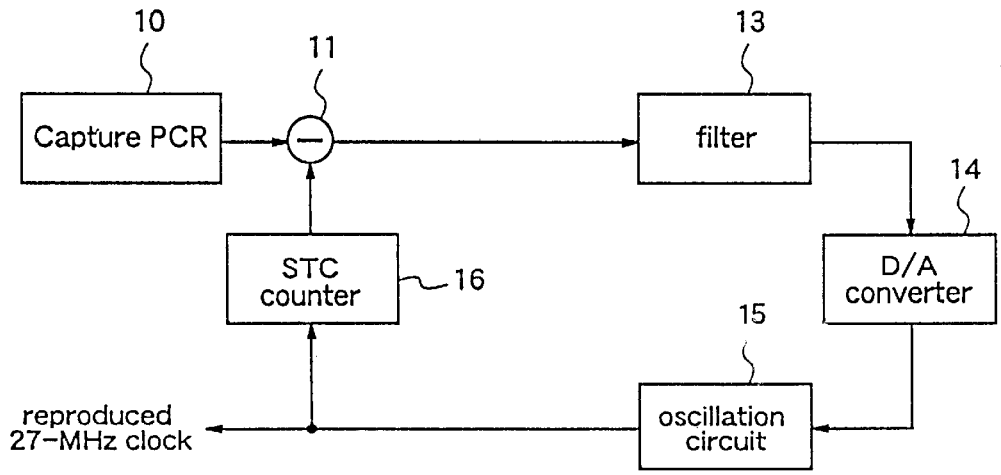
FIG. 5 is a block diagram illustrating mainly a clock generation unit in a prior art broadcasting receiver.

As shown in FIG. 4, the broadcasting receiver of the second embodiment includes a capture TDT 17 in place of the capture PCR and other construction is the same as that in the first embodiment. The TDT in this case is transmitted every two seconds. By detecting this TDT, the present invention can be similarly applied to a construction where the clock is reproduced on the basis of the TDT. According to this construction, while the precision is inferior to that in the first embodiment, the degree of inferiority is of negligible level for the practical use.

In the respective embodiments, the control circuit 12 is placed just behind the subtracter 11, because noises due to disturbance of signals can be reduced more effectively than in a case where the control circuit is placed in the latter stage of the filter. Therefore, in a case where superimposition of noise does not matter, the control circuit can be provided in other positions, such as just behind the filter 13 or the D/A converter, or just behind the capture PCR 10 and the STC counter 16.

Industrial Availability

The present invention relates to a broadcasting receiver and particularly improves precision in an internal timer of a broadcasting receiver having a power-saving (sleep) mode for reducing power consumption on standby, thereby enabling to perform a reserved processing, such as a reserved recording, with certainty.

What is claimed is:

1. A broadcasting receiver which generates a clock of a predetermined frequency based on a reference signal included in digital data including time-axis information, and has an internal timer operating with the clock, comprising:

reference signal detection means for detecting the reference signal;

clock generation means for generating a clock of a frequency based on the reference signal;

counter means for counting the clock;

difference generation means for calculating a time difference between output of the counter means and the reference signal and producing an output indicative of the time difference; and control means for holding the output of the difference generation means based on a control signal indicating that the receiver is changed to an operation standby state and for controlling generation of the clock by said clock generation means during the operation standby state based on the output of the difference generation means held in said control means immediately before the receiver is changed to the operation standby state.

2. The broadcasting receiver of claim 1 wherein when the receiver is in the operation standby state, the reference signal detection means detects the reference signal, the control means releases the holding of the output of the difference generation means, whereby the receiver is put into an operation state for a prescribed time.

3. The broadcasting receiver of claim 1 wherein the digital data comprises a transport stream including the time-axis information; and the reference signal comprises a program clock reference indicating a broadcasting time for each program.

4. The broadcasting receiver of claim 1 wherein the digital data comprises a transport stream including the time-axis information; and the reference signal comprises a time and data table indicating a broadcasting time for each program.

* * * * *